(12) United States Patent
Serven et al.

(10) Patent No.: US 11,605,036 B2
(45) Date of Patent: Mar. 14, 2023

(54) SYSTEM AND METHODS FOR POWER SYSTEM FORECASTING USING DEEP NEURAL NETWORKS

(71) Applicant: Verdigris Technologies, Inc., Mountain View, CA (US)

(72) Inventors: Danny Serven, Mountain View, CA (US); Jacques Kvam, Mountain View, CA (US)

(73) Assignee: Verdigris Technologies, Inc., Mountain View, CA (US)

( * ) Notice: Subject to any disclaimer, the term of this patent is extended or adjusted under 35 U.S.C. 154(b) by 1253 days.

(21) Appl. No.: 16/100,084

(22) Filed: Aug. 9, 2018

(65) Prior Publication Data

US 2020/0349484 A1 Nov. 5, 2020

Related U.S. Application Data

(60) Provisional application No. 62/543,153, filed on Aug. 9, 2017, provisional application No. 62/543,276, filed on Aug. 9, 2017.

(51) Int. Cl.
*G06Q 10/06* (2012.01)
*G06N 5/04* (2006.01)
(Continued)

(52) U.S. Cl.
CPC ....... *G06Q 10/06312* (2013.01); *G05B 15/02* (2013.01); *G06N 3/08* (2013.01);
(Continued)

(58) Field of Classification Search
CPC ............ G05B 15/02; G05B 2219/2639; G06N 20/00; G06N 3/08; G06N 5/046;
(Continued)

(56) References Cited

U.S. PATENT DOCUMENTS

| 2008/0177423 | A1* | 7/2008 | Brickfield | ............... | H02J 3/008 |
| | | | | | 700/291 |
| 2012/0259474 | A1* | 10/2012 | Razum | ................... | G06Q 50/06 |
| | | | | | 700/291 |

(Continued)

*Primary Examiner* — Kidest Bahta
(74) *Attorney, Agent, or Firm* — Procopio, Cory, Hargreaves & Savitch LLP

(57) ABSTRACT

A method of managing energy by use of processing logic that comprises a load processor as a cloud service is provided. The method includes receiving power load information from a data collection system located at a building and using a cloud analysis layer that employs machine-learning and artificial intelligence for optimization control, analyzing the received power load information to disaggregate load waveform signals and identify device-based power loads by use of a neural network to perform historical device demand and performance analysis to generate device-based demand forecasting, generating demand forecasts for the building to mitigate peak demand based on analysis of a power draw signal and the generated device-based demand forecasting, and determining whether the generated demand forecast for the building is to peak in a near future, based on threshold values of at least one of generated device-based demand forecasting, power price or cost information, and user behavior analysis.

20 Claims, 8 Drawing Sheets

(51) Int. Cl.
*G06Q 10/0631* (2023.01)
*G06N 5/046* (2023.01)
*G05B 15/02* (2006.01)
*G06N 3/08* (2023.01)
*G06N 20/00* (2019.01)
*G06Q 50/06* (2012.01)

(52) U.S. Cl.
CPC .............. *G06N 5/046* (2013.01); *G06N 20/00* (2019.01); *G05B 2219/2639* (2013.01); *G06Q 50/06* (2013.01); *H02J 2310/64* (2020.01)

(58) Field of Classification Search
CPC .............. G06Q 10/06312; G06Q 50/06; H02J 2310/64; Y02P 90/82
See application file for complete search history.

(56) References Cited

U.S. PATENT DOCUMENTS

| | | | |
|---|---|---|---|
| 2014/0285357 A1* | 9/2014 | Schlaeffer | G06Q 50/06 340/870.02 |
| 2014/0336960 A1* | 11/2014 | Haghighat-Kashani | G06Q 50/06 702/60 |
| 2014/0371934 A1* | 12/2014 | Kubota | G05B 13/04 700/291 |
| 2017/0011297 A1* | 1/2017 | Li | H02J 13/00002 |

* cited by examiner

SYSTEM AND METHODS FOR POWER SYSTEM FORECASTING USING DEEP NEURAL NETWORKS

CROSS-REFERENCE TO RELATED APPLICATIONS

This application claims benefit of priority from Provisional U.S. Patent application Ser. No. 62/543,153 filed Aug. 9, 2017, and Provisional U.S. Patent application Ser. No. 62/543,276 filed Aug. 9, 2017, the contents of both of which are incorporated by reference.

BACKGROUND

Field

The present disclosure relates to power systems, and more specifically, to systems and methods for forecasting power demand using deep neural networks.

Related Art

In related art implementations, building management systems are typically custom designed proprietary monitoring systems for commercial buildings that set off alarms when there is a malfunction of a critical device. Building management systems rely on facilities managers and engineers to configure systems and study power performance metrics to calibrate power usage that keeps buildings running 24 hours a day. Some building management systems allow facilities managers and engineers to remotely manage specific settings of critical devices.

Fifty percent of a monthly energy bill for commercial buildings is often based on energy demand surcharges. Energy demand surcharges are peak-time price hikes when the building power demand and power prices peak. Traditionally, building management systems alert the managers and engineers when a building enters a period of peak power demand, and the managers or engineers react to intervene to reduce the power demand by shutting-off devices.

Buildings include a physical infrastructure of wires for power delivery and communication networks (e.g., copper, CAT5, POTS telephone systems, Ethernet, etc.). In related art, intelligent devices may be designed to communicate information based on a communication protocol or transmission medium to specific devices or compatible systems. However, building management systems are not traditionally compatible with different types of intelligent devices and traditional devices that are not designed to communicate information.

SUMMARY

In example implementations, a building's power performance is monitored and analyzed using artificial intelligence and deep neural networks to forecast power demand and initiate response strategies to avoid peak-time price hikes.

DETAILED DESCRIPTION

Figure 1:
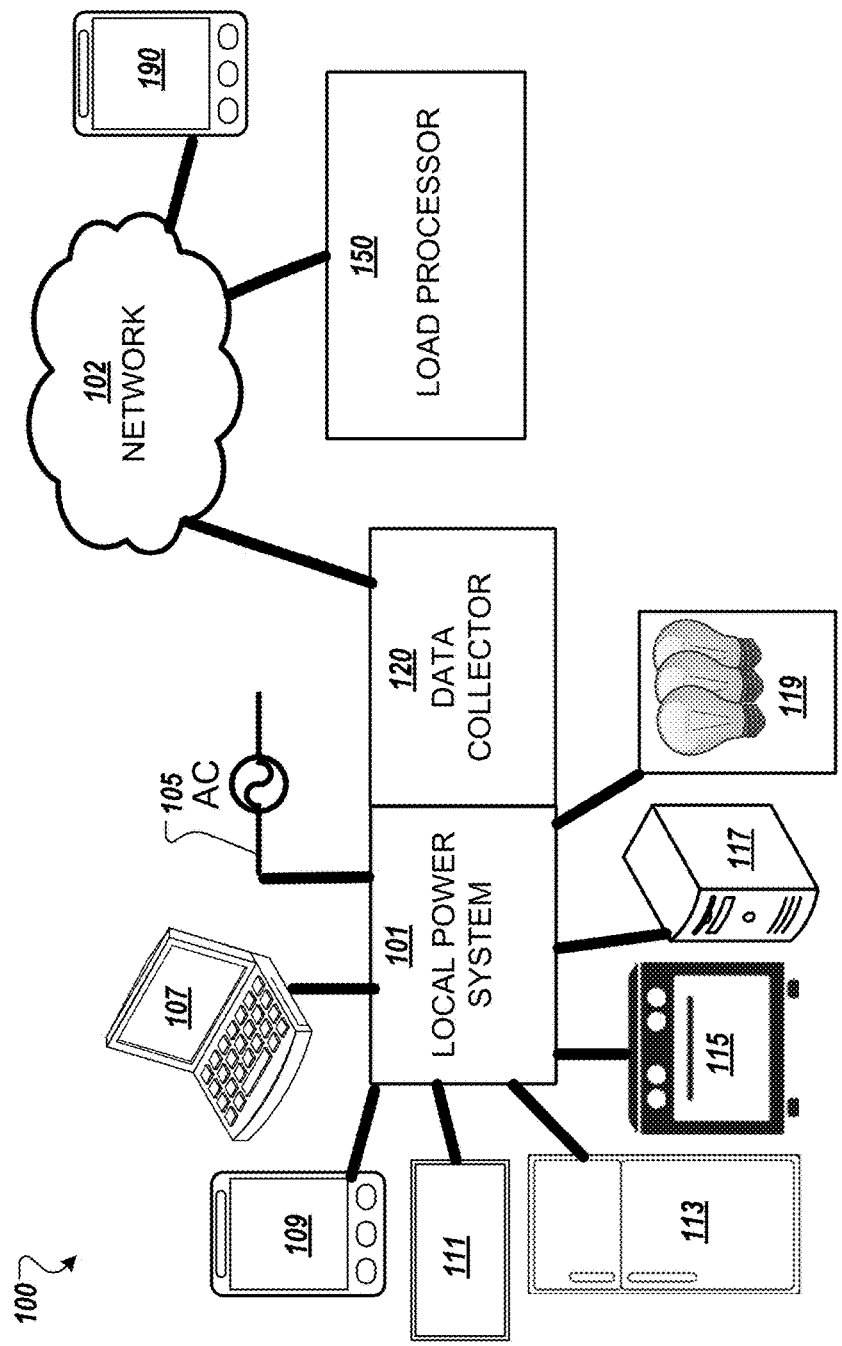
FIG. 1 illustrates an example diagram of a building management system, in accordance with an example implementation.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

Methods and systems described herein use artificial intelligence (AI) for demand management forecasting models that continuously update forward energy forecasts that learns based on actual, previously unseen data. In example implementations, response strategies are developed using deep neural networks that can trigger building management controls to dynamically cycle equipment and suppress peak demand.

Methods and systems described herein include collection and smart unification of the many data streams available to building operators. Artificial intelligence is used to monitor power usage of a building to identify when and how to reduce peak demand. Instead of reacting to energy usage, analysis of the building's signals is used with artificial intelligence to proactively forecast and provide control instructions to manage the energy usage before the peaks occur.

Instead of demand response, the methods and systems described herein include proactive Automated Demand Management (ADM). In an example implementation, a method includes real-time forecasting, optimization, and data unification to manage your energy peaks—a step above responding. It brings the power of artificial intelligence to control the building.

Example implementations include tracking the building's energy usage to provide insights and control commands to save money by making proactive decisions to adjust energy usage and using forecasted control command to reduce device shut downs.

For example, throttling a single exhaust fan can reduce the building's power demand by kWs peak throughout a month.

In another example, the system selectively throttles HVAC equipment based on intelligent forecast-driven pre-cooling.

Methods and systems described herein detect and curtail demand events for a building to reduce peak usages during a billing cycle and avoid demand based penalties. For example, the system can cycle demand based on a set of minutes (e.g., 15-minute) per demand period to reduce demand during a billing cycle. Unlike traditional ADR, methods and systems described herein create persistent demand reduction across an entire month that demonstrates kWs of average curtailment. AI technology continuously monitors the building to proactively manage demand, instead of just responding to a utility signal. By using dynamic equipment cycling, methods and systems described herein achieve reductions in power cost without noticeable occupant impact.

Methods and systems described herein analyze an entire building to predict when the building will cross a demand threshold. Instead of just turning off an AC unit for hours, the AI unit analyzes the individual circuits or devices contributing to the peak, and identifies the least intrusive response strategy to shift demand. The AI unit determines peak demand response strategies that minimize turn-off or shutdown devices. Peak demand response strategies by the AI unit dynamically cycle different pieces of equipment (with different peak power draws) to achieve sustained reductions in total demand as needed. As the AI unit analyzes more BMS integration points, the AI unit can add response actions (e.g., pre-cooling) to a library of countermeasures.

The system is automated and develops response strategies based on machine-learning at times that are convenient to the occupants of the building. Interfaces and mobile applications are provided for building managers to pre-configure settings, approve or override response strategies, and access real-time detailed performance and forecasting data.

FIG. 1 illustrates an example diagram of a building management system 100, in accordance with an example implementation. The system 100 includes a local power system 101 that delivers power to devices 105-119 at a location. For example, the local power system 101 as part of a residential or commercial building can be a pre-existing power distribution network with devices connected via sockets (e.g., heating, ventilation and air conditioning (HVAC) 105, laptops 107, tablets 109, televisions 111, refrigerators 113, appliances 115, consumer devices 117, lights 119, garage door openers, sprinkler systems, etc.) and hard wired devices (e.g., HVAC 105, security systems, appliances 115, lights 119, sprinkler systems, etc.).

Data collector system 120 can be coupled to the local power system 101. The data collector system 120 can be attached to local power system 101 to monitor aggregate power, or power used by an individual circuit, at a location (e.g., commercial, industrial, or residential building). In an example implementation, circuit based sensors can collect power usage data at a central location, for example, a distribution board (e.g., panelboard, breaker panel, electric panel, etc.) For example, circuit based sensors can be used at an electric panel, where a single sensor is clamped onto each circuit, and the sensors are daisy-chained together, with a data transmitter to connect to a cloud analyzer system. Circuit based sensors can be used for super-high-frequency disaggregation (e.g., 8 kilohertz).

The data collector system 120 collects thousands of data points per second, performs on-site pre-processing, and the data is transmitted via a network 102 to a load processor with a cloud-based analytics engine 150. The data collector system 120 can include a data transmitter to connect to LAN and WAN accessible service via the network 102 through a connection with a wireless carrier system (e.g., through a global system for mobile communications (GSM), code division multiple access (CDMA), wideband code division multiple access (WCDMA), time division multiple access (TDMA), universal mobile telecommunications system (UMTS), long term evolution (LTE), worldwide interoperability for microwave access (WiMAX) or other wireless communication protocol connection). The load processor 150 can execute under any operating system (OS) (not shown), in a native or virtual environment, and one or more applications can be deployed that include a logic unit, application programming interface (API) unit, input unit, and output unit.

The load processor 150 maps out energy use inside of a building on a system-by-system, appliance-by-appliance level, using a minimal number of sensors located at central collection points. Circuit based sensors perform high-frequency data-energy disaggregation to deliver accurate and granular results. The sensors can catch tiny blips and squiggles in voltage and current across a building's key circuits in excruciating detail, and use that data to identify individual devices on the circuits, and then track them over time. According to some example implementations, sensors attached to a local power system can sample circuit level power usage information and detect characteristics of the building.

In other example implementations, device performance can be remotely monitored and controlled based on machine-learning from the broad network of sensors and information. Example aspects include an automated system to map out devices that connect to a local power system to determine a device profile or fingerprint. According to such example implementations, sensors attached to a local power system can sample power usage information and detect characteristics from each device that connects to the local power system. For example, a frequency of the power draw signal can be used to categorize each device type.

The load processor 150 outputs real-time power demand reports with forecasted power demands that are accessible by mobile device 190 via the network 102. The load processor 150 uses AI and/or neural networks to generate response strategies to mitigate peak demand surcharges using forecasted power demand and detected anomalies. The load processor 150 can automatically tailor mitigation techniques and implementation of the response strategies based on efficiency, cost saving, and/or convenience to occupants of the location. The load processor 150 can interact with one or more devices 190 to provide remote control or customization of response strategies via network 102 connected to the load processor 150.

In an example implementation, sensors are clipped onto circuit breakers, networked together and wired into an independent communication interface. Data from the sensors is streamed to cloud-based software for analysis that is coupled with weather and electricity pricing data from utilities or alternative energy resources (e.g., solar cells, on-site batteries, etc.). The system can alert building managers (e.g., users) when the facilities are using large amounts of electricity during high demand and identify devices to mitigate the demand. For example, adjusting heating and cooling systems based on current weather data, utility power pricing, building performance forecasts, etc.

By analyzing continuous stream of energy data by the data collector 120 that is coupled to the local power system 101, the load processor 150 drives smarter and more responsive building operations, which in turn reduces energy costs. Sensor can wirelessly stream millions of samples per second from a location's electrical panel into the cloud. The load processor 150 analyzes these 'electrical fingerprints' to automatically optimize building controls, predict future breakdowns and send users critical notifications about energy use.

For example, the data collector 120 can be compatible with legacy power systems and include a built-in native LTE connectivity to transmit power data collected from sensors attached to the local power system. This sensor can be an always-on secure network for real time remote diagnosis of equipment faults and other energy signature anomalies. The system 100 can also include increased edge-processing and storage as well as improved internal diagnostics.

The load processor 150 proactively predicts the building's performance using the accurate forecasts of utility, weather, and energy data to automate the reduction of inefficient energy operations. The load processor 150 employs AI to interpret patterns and behavior of each appliance. The load processor 150 detects changes in the electrical signature using frequency domain analysis to detect changes in the signals that could identify potential problems. During critical periods of energy use, the load processor 150 suggests response strategies for specific electrical equipment to be adjusted to manage the electric consumption.

Figure 2:
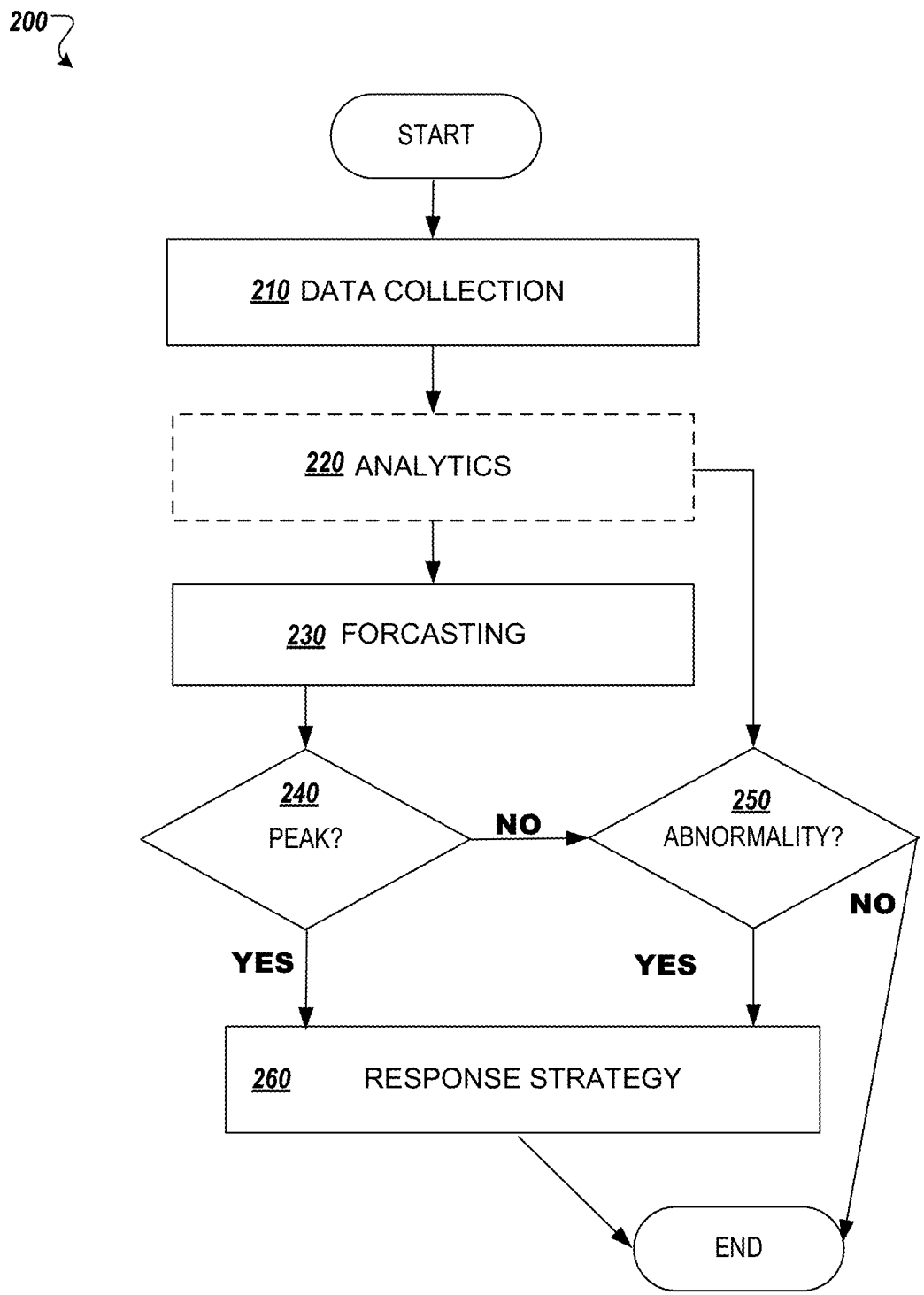
FIG. 2 illustrates a flow diagram 200 for artificial intelligence control scheme with effective demand management in accordance with an example implementation.

FIG. 2 illustrates a flow diagram 200 for artificial intelligence control scheme with effective demand management in accordance with an example implementation. The method 200 is performed by a computing device, such as computing device 805 in FIG. 8, using processing logic that may comprise hardware (circuitry, dedicated logic, etc.), software (such as is run on a general purpose computer system or a dedicated machine), or a combination of both. Method 200 may also be performed by a load processor 150 as a cloud service associated with network 102 of FIG. 1. Though method 200 is described below as being performed by load processor, method 200 may also be performed by other processing logic.

At step 210, the load processor can receive power load information from a data collection system located at a building. The artificial intelligence control scheme includes means for collecting, analyzing, and controlling power information for devices within a building. Information about each powered device can be collected based on the device's electric draw from the building's central power system without requiring any changes to the underlying device.

According to an example implementation, data collection layer gathers data at a central point of a site (e.g., location, building, etc.) and communicates the gathered data to a cloud analysis layer that employs machine-learning and artificial intelligence for optimization control. The data collection layer can gather data from any device that connects to the local power system. For example, a device may connect via dedicated circuits, i.e., a HVAC system, elevators, lighting, etc. Some devices can connect via a socket, for example, appliances. Other device may be indirectly connected, for example, via a power strip or secondary load. The data collection layer can identify loads for each separate device that draws power from the local power system regardless of the connection means.

According to an example aspect, data gathered from a local power system of a building (e.g., a breaker box) allows for communication and control of devices receiving power via the local power system. The data collection process, as described herein, eliminates extra-hardware, installation, and maintenance costs required by related art building management systems. Further, the data collection process described herein automatically adapts as devices are connected and removed from the local power system. Since the devices are identified based on intelligent machine-learning analysis of the power load signals, manual configuration or data entry of building specific information is not required to map out the devices connected to the local power system.

The data collection layer can communicate the gathered data to a cloud analysis layer via multiple communication means, for example, an Internet connection (e.g., Ethernet, wireless, cellular, etc.). The cloud analysis layer processes the information to provide historical, real-time, and predictive details regarding power consumption and costs of each device, device type, as well as other performance and control capabilities as described herein. Accordingly, each device connected to a local power system is detected and labeled at a central point of the local power system based on the sensor information without requiring additional details, descriptions of the building, distributed sensors placed around a building or any visual inspection the space of the building.

Optionally, at step 220, the load processor analyzes the collected data to disaggregate load waveform signals and identify a device based power loads in some example implementations. The load processor uses artificial intelligence and neural networks to perform detailed historical device demand and performance analysis to generate device-based demand forecasting. An intelligence layer is established on top of the (pre-existing) power delivery infrastructure to allow for data analysis and control of devices.

As the signals come in from each of the circuits, the information is iteratively screened to separate the signal into multiple signals and label each signal with an identifier. The screening process analyzes a circuit signal to disaggregate the signal and identify the underlying devices receiving power via the circuit. That is, a circuit may be dedicated to a particular space (e.g., room, wall of a room, etc.) or type of device (e.g., HVAC, elevator, lights, switch, etc.) and the signal of that circuit can be analyzed to separate out signals from each device receiving power via the circuit.

Identifying a sub-signal of the circuit signal can be based on a commissioning process including machine-learning to categorize types of sub-signals that are then subtracted out from the circuit signal to identify other sub-signals. The screening process includes identifying a first sub-signal of the circuit signal, subtracting out identified sub-signal from the circuit signal, and identifying a second sub-signal to further identify signals from other devices receiving power via the circuit.

For example, a room with multiple lights controlled by a switch can be associated with a single circuit that is separated out and labeled to identify each light controlled by the switch. Identifying and labeling each signal can include clustering similar signals together so that each type of signal is associated as a common device. For example, the separate signals for the multiple lights controlled by the switch can be clustered as lights associated with a common room switch.

The common signal can be subtracted out from the circuit signal to further identify other devices receiving power via the circuit. In an example, where a wall switch controls five ceiling lights and two sockets, each ceiling light can be labeled as a common set of lights associated with the switch, and other devices connected to the sockets can be labeled, as well as, as associated with the switch. The screening processes iteratively repeat to identify each of the underlying components receiving power via the circuit. As described herein, the screening process that identifies each signal is based on sensors placed on circuits at a central point of the local power system and intelligent machine-learning analysis of the power load signals from each circuit to identify the device receiving the power.

At step, 230, the load processor generates demand forecasts for the building to mitigate peak demand. The power draw signal is analyzed to build complex predictive models of how a building operates and the power performance of each device in the building. In some example implementations, forecasting can be determined for a building, circuit, or sensor grouping based on historical performance statistics that are used with machine-learning to forecast and predict device usage and performance. For example, a forecast may be built using the virtual version of the building to predict future events that impact the power performance of the building. The forecasts are used to adapt control and avoid energy utilization spikes.

In other example implementations, power draw data of plural devices may be gathered and analyzed (e.g., waveform analysis) to identify device performance statistics that are used with machine-learning to forecast and predict device usage and performance.

For example, discreet cluster maps may be created of the underlying devices that are recognized and assigned editable labels. Signals can also be labeled based on an aggregate end use of that circuit. For example, the mapping can identify and separate out each phone charger, laptop, display, etc. in a building. A virtual version of the building is developed from the discreet cluster maps and is enriched. The cloud analysis includes collecting enrichment information from third party sources to further analyze and predict power performance of the building.

Enrichment from external data, such as real estate databases, satellite imagery, company networks, can be added into the analysis. External data refers to data not physically collected by sensors attached to the local power system. For example, enrichment data can be gathered to a real estate database or municipal database to collect a square footage, number of floors, shape, location, etc. of the building. Local weather and climate information can be gathered from internet based weather resources. For example, a local power system of a hotel can be analyzed based on sensors attached to the local power system and enriched based on occupancy information from a historical data model. A forecast is built using the virtual version of the building to predict future events that impact the power performance of the building. The forecasts are used to adapt control and avoid energy utilization spikes.

At step 240, the load processor determines whether the forecasted power demand for a building, device and/or location is likely to peak in the future. Peak detection can be based on threshold values of the calculated metrics, power price or cost information, behavior analysis, etc. In response to the forecasted power demand for a building, device and/or location detected to peak in the future, the load processor at step 260 can initiate or schedule a response strategy. For example, the load processor can schedule to adjust an HVAC set-point to reduce the power load of the HVAC throughout the day based on weather data or energy costs changes. The response strategy may send an alert or recommendation to a building manager, transmit a control signal to a device, cycle reserve power, etc.

At step 250, the load processor can use the analytics 220 and/or forecasting 230 to detect anomalies or changes in the building's energy performance other than a peak condition to implement or schedule a response strategy. The load processor can detect a building or device's power demand trending counter to the building's or device's historical performance and provide alerts to the user.

In some example implementations, the load processor, using artificial intelligence, may detect real-time performance of devices that are compared to historical and forecasted performance to determine an abnormality and the response strategy. In an example implementation, the artificial intelligence can employ historical tracking (e.g., running averages), and enrichment data (e.g., weather data), and can also correlate performance between different devices to detect real-time performance that indicates an abnormality.

In other example implementations, the artificial intelligence can employ historical tracking (e.g., running averages), enrichment data (e.g., weather data), and correlate performance between different circuits to calculate continuously updated forecasts and provide alerts when a forecast indicates an abnormality.

The response strategy triggered by the load processor can be selected based on the severity of deviation from the expected power draw and/or criticality of the building's performance or the type of device.

For example, a hot-water heater or boiler may be forecasted to reach an increased power draw level during early morning hours based on occupancy information from external enrichment data, and the load processor can alert the user to abnormal power draw from the hot-water heater that is counter to historical performance in view of the occupancy. In the example, the building manager is alerted to the abnormal performance prior to a critical event and independent of a peak demand.

In some example implementations, a building may employ intelligent devices (e.g., Internet-of-Things (IOT) devices) that malfunction, lose connectivity, or are hacked. According to an example aspect, the load processor provides independent back-up monitoring and control of intelligent devices (e.g., IOT devices). For example, a smart thermostat may include its own operating settings and intelligent control for adjusting the HVAC system, and the load processor can detect an anomaly of the smart thermostat's or HVAC's power draw and performance that indicates a malfunction. Accordingly, performance of legacy devices (e.g., non-Internet controlled devices) and intelligent devices that connect to a building's local power system are analyzed by the load processor to detect irregular or inefficient power usage.

Figure 3:
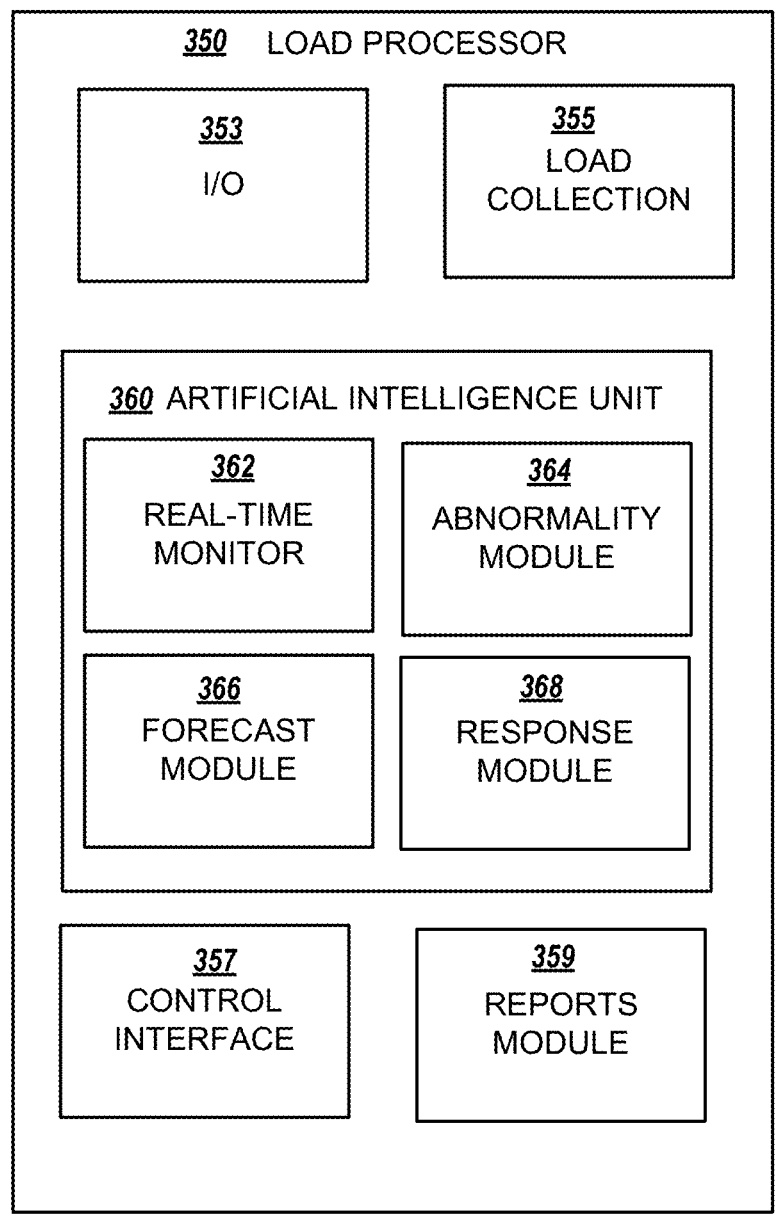
FIG. 3 illustrates an example load processor, in accordance with an example implementation.

FIG. 3 illustrates an example load processor 350, in accordance with an example implementation.

The load collection module 355 can interact with one or more local power systems, circuits or devices to receive inputs associated with a power performance of the building. The load processor 350 can include an I/O interface 352, a load collection interface 355, a control interface 357, a report module 359, and an artificial intelligence unit 360. In an example implementation, the I/O interface 352 includes one or more communication interfaces communicatively connected with a location directly or via a network 102 in order to receive information associated with power performance (e.g., sensed data, environment data, etc.) and enrichment data. The I/O interface 352 can receive data from different types of circuits or devices (e.g., devices 105-119) indirectly, directly, or third-party cloud services. The AI unit 360 analyzes information such as monitored power data, appliance usage, etc., so as to identify building power performance patterns on a circuit level, building level, or device-based level.

Enrichment data can include information about a location, environment, power supplier, occupants, use of the location, etc. In an example implementation, services can provide environment data regarding the physical layout of the location, relationships between the people at the location, weather information, safety information, and location based policies, etc. For example, in an office, environment data can include the office layout, occupancy schedule of workers, etc. For example, a building entry sensor system can include occupancy information detected at the location that can be provided via an API.

The artificial intelligence unit 360 can include a real-time performance monitor 362, an abnormality module 364, a forecast module 366, and a response module 368. The AI unit 360 includes a training process to learn patterns of the location's power performance, building behaviors or device behaviors and generates recommendation models to determine response strategies for peak demand events, abnormality events, performance improvement reports.

In an example implementation, a computer readable medium includes instructions that will cause a processor that executes the instructions to receive a training data set that includes a tracking of building, circuit, or device power draw performance via the I/O interface for machine learning. The load processor 350 analyzes the training data set using machine learning to train machine-learning-based detection profiles that can be used to classify new devices and/or recognize patterns as peak or abnormal event data. The AI unit 360 uses machine-learning-based detection of patterns with labels and/or categorization to indicate device performance patterns of individual circuits and/or building level performance patterns. AI unit 360 can analyze the data to identify triggers that indicate a transition from a first pattern to a second pattern. Response strategies can be automatically implemented via the control interface 357 or reported with alerts via the reports module 359.

In some example implementations, the AI unit 360 may take the signatures from the different circuits and compare them to each other. It may also perform time shifting or compare different circuits based on other factors like the weather, time, etc. to see where signals approach a peak and predict where peaks will occur using the neural network to predictively recommend and, in some example implementations, act automatically. Automatic operation may also be disabled by a user or administrator as needed.

Further, once a model has been built based on the signatures of the different circuits, current base data up to the minute, and/or the current weather data up to the minute may be fed into the model to infer what the future energy is going to be. By analyzing the forecasts, a strategy to implement energy savings may be developed and either implemented automatically which, in the case of the automated energy control system, or manually in terms of, for example, telling the building admin to move to a backup plan.

The strategy may also implement semi-automatically as well. For example, the building management system may have a backup energy management program programmed in, which can be disabled as needed, and still provide an automated or a user-acted curb.

By looking at any individual circuits or devices during the modeling, certain circuits or devices that are more weather dependent may be identified (e.g., HVAC, air movement, etc.) and distinguished from other circuits or devices. By understanding this breakdown and being able to correlate those factors and features into a forecast model, an ability to make a more detailed forecast with respect to opposing trends in the sub-circuits in correlation to these external data sets and weather may give the ability to get more accurate building level forecast than if a single building level meter is used.

Further, in some example implementations, both weather and geographical factors may be considered in the modeling. For example, the modeling may identify that in the summer months if you got in a building with A/C that circuit is going to be more sensitive. But another time of year, say the autumn or spring, for that circuit, the sensitivity factor, the correlation factor will go down a little bit. Further, in the winter time, maybe in Alaska or somewhere else, there might be a need for energy management with the lighting, which may be more time dependent.

Additionally, the size or purpose of the building may cause variations in the energy usage for the circuits or devices of most criticality. For example, a factory operation may see more variability in equipment designated circuits based on production demands. Further, automation factors may have little HVAC demand as the robots may be capable of functioning in a wider range of temperatures, but the robots themselves may be the variable energy factor of most concern. Conversely, office space may see more variability in HVAC systems as people come and go causing temperature fluctuations.

Additionally, data centers or server farms may see flat device energy usage but experience variability in HVAC heavily linked to exterior temperature due to the need to maintain a consistent interior temperature for the computer systems. Further, such systems may also include control economizers that vent external air into a facility when external temperatures drop below a threshold to allow efficient cooling at lower energy levels.

The AI unit 360 may take these factors into consideration and generate a customized model tailored to the various other factors discussed above as may be apparent to a person of ordinary skill in the art.

Figure 4:
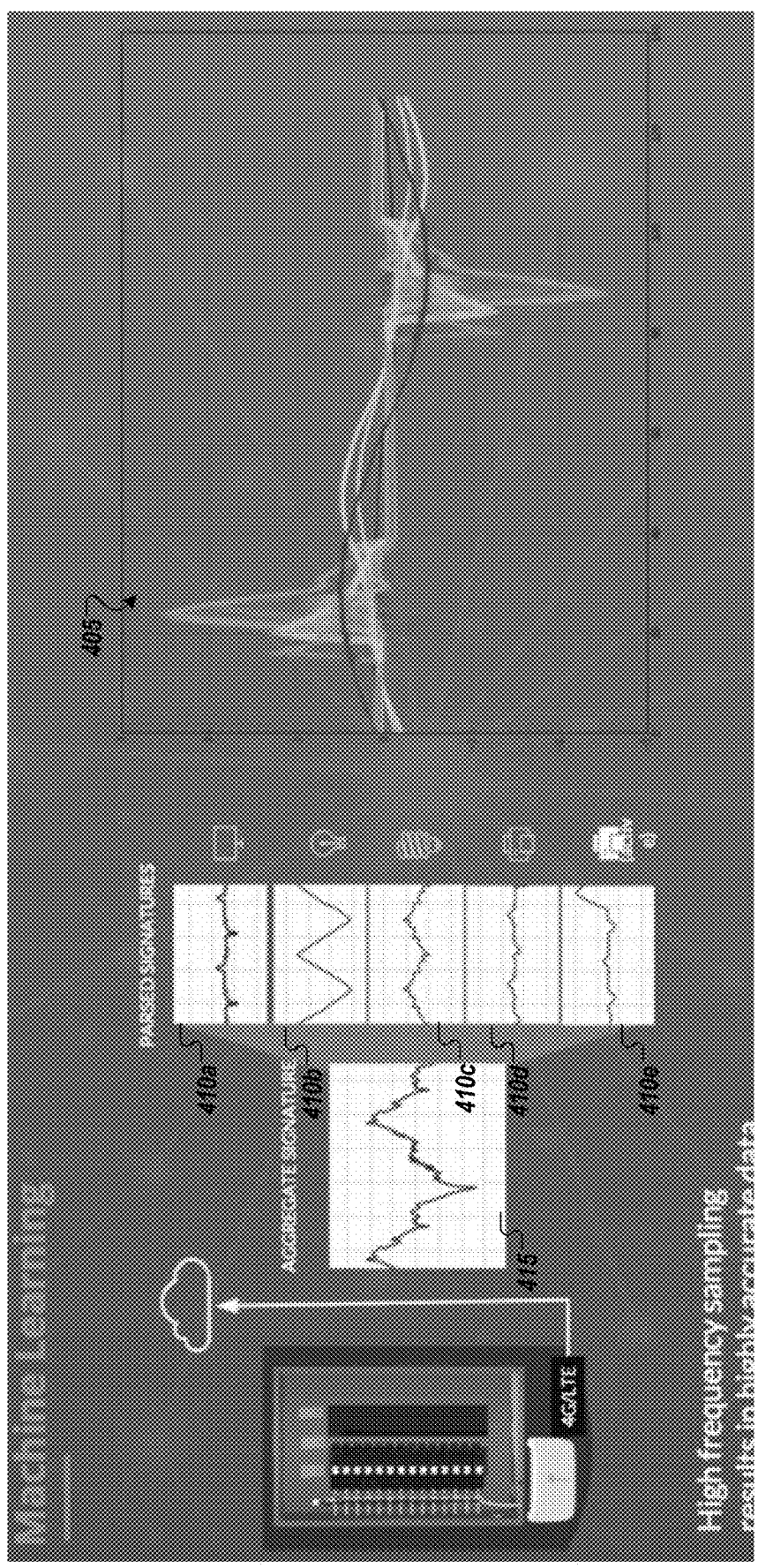
FIG. 4 illustrates parsed signature analysis in accordance with an example implementation.

FIG. 4 illustrates an example load collector User Interface (UI) 405 according to an example implementation. More specifically, FIG. 4 illustrates parsed signature analysis UI 405 in accordance with an example implementation. A neural network is employed to analyze the input and perform deep learning analysis. The neural network is used to observe the device behaviors on a time scale of seconds over a period of time to develop a signature of the device's waveform. For example, a device's behavior, as a feature of time scale and over a period of time, can identify the difference between the power draw for a glowing element in a hair dryer versus a toaster. By analyzing the time scale and period, the neural network provides context clues of peripheral devices on the same circuit to indicate a room location, type of device, and/or device operation. The output is a signature that the group of neurons forms for a device. For example, the analysis can identify a toaster in the kitchen versus a hair dryer in the bathroom.

Data inputs may be collected at high frequencies that have indiscrete layers that can describe features as neurons for specific features to determine distinct performance characteristics. Data inputs of power performance represent the waveforms 410a-410e as neurons that are separated out to re-generate a new waveform 415 based on the neurons's behaviors. Combinations of neurons in a layer can depict the performance of an individual device with temporal analysis to detect pattern events. An event can be associated with a single device for one single chain that ties the neurons together to track the device over time. Clusters of the neurons changing states can indicate the device's behavior over time and correlate the device's behaviors with other devices.

The neural network tracks the different devices based on how each device consumes energy, when the device consumes energy, and how much energy is consumed. A device added to a power strip attached to a circuit of the local power system (e.g., indirectly plugged into a socket) can be detected, categorized, and tracked. As the device is disconnected from the power strip and connected directly to a socket, the device's move can be detected, and its performance via the socket can be coupled to its historical performance with the power strip to create a continuous history of the device's behavior.

As multiple devices tend to stack onto a waveform, features can identify types of devices that differentiate power performance. Collections of neurons for different devices that can change state can be used to infer correlations. For example, if a combination of five neurons turn on and off and on and off together at the same time, the combination represents a device to track. The neural network can include several different waveform signatures to track device performance over the course of months or years. Hidden clusters of neurons are designed to replicate the specific features that make signature waveforms.

Detected types of behavior with similar shapes or clusters on different circuits can be used to classify the type of device. The neural network can track a number of the same devices and follow the device as it is disconnected from and reconnected to from the local power system. For example, a building may have dozens of mobile phone chargers connected to different power outlets. Enrichment data and thermal models of the buildings can also be added to the neural network to derive context based correlations and device behavior relationships.

The example implementations may categorize and over time collect a library of labels that are automatically assigned to detected devices. In an example implementation, the different signatures are tracked compared to behaviors from a behavior library. Based on a combination of the signature and the behavior library, a suggested label for the device can be assigned. In an implementation, an approximation of the devices locations through the circuit can be compared with building schematics to determine the location.

Building based device signature libraries and global device signature libraries are developed based on waveform signatures that can identify different types of devices, different models, and/or brands of devices. In an example implementation, a crowd based supervisory approach is used to identify common data structure to identify signature waveforms. For example, categorized waveform signatures from one building can be used by the load processor to identify devices in another building.

In some implementations, candidate classifications based on the neural network can be provided to occupants of the building to be confirmed. In another implementation, training data can be acquired via an installer tool that geotags devices and sends a locating signal for the neural network to define circuit locations.

Figure 5:
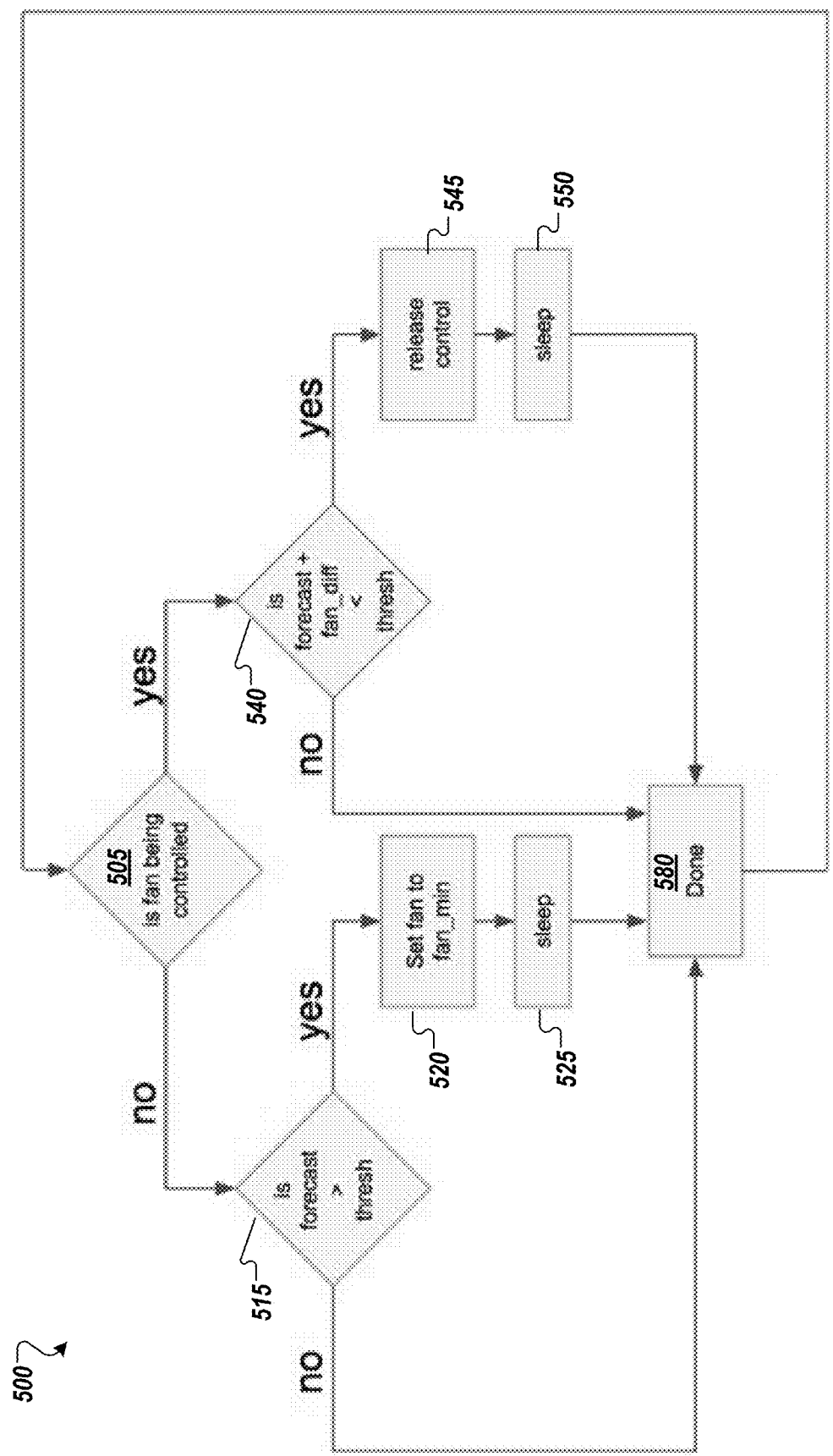
FIG. 5 illustrates a flow of a demand response in accordance with an example implementation.

FIG. 5 illustrates a flow chart of a demand response process in accordance with an example implementation. The process may be performed by a computing device, such as computing device 805 of FIG. 8. Examples of demand responses based on AI driven automated demand management can include automatic throttling of equipment at specified set points; programmatic startup/shutdown and pre-cooling schemes; intelligent, dynamic cycling of high-draw, non-critical systems; sophisticated bring up and pre-cooling strategies, real-time forecasts are dynamically calculated based on circuit-level, device-level, or building-level data and external, non-BMS data points.

The process of FIG. 5 is predicated on energy billing schemes that charge you for the highest 15-minute average energy in the previous month. In order to curb these one-time peaks, the process may facilitate maximizing savings achieved by turning certain appliances off, but minimizing downtime. In the example implementation discussed below, the appliance or device may be an exhaust fan, but other appliances or devices may be used. This curbing process may be considered the output of recommendation analytics and forecasting performed by a neural network scheme. For example, a neural network, such as a convolutional neural network, may take in weather data and historical energy data for a building performing some level of feature extraction and provide a 24-hour forecast for building usage identifying where or how the 15-minute peaks may occur.

As illustrated, the process 500 includes a determination at 505 whether a device (e.g., a fan) is being controlled or turned off. If the device is not being controlled (No at 505), another determination is made at 515 to determine whether current forecasted demand for the device exceeds a threshold. If the forecasted demand exceeds the threshold (Yes at 515), the device is set to a minimum power level at 520. Further, the computing device may enter a sleep mode at 525 and an iteration of the demand response process may be deemed done at 580. The process 500 may then return to 505 for another iteration.

Conversely, if the forecasted demand at 515 does not exceed the threshold (No at 515), the iteration of the demand response process may be deemed done at 580 without setting the device to a minimum power level. Again, the process 500 may then return to 505 for another iteration.

Further, if the device is determined to be controlled or powered down (Yes at 505), another determination is made at 540 to determine whether the combination of a forecasted demand for the device and the differential change in demand caused by turning the device to a higher power level is less than the threshold. If the combination of the forecasted demand and the differential demand of the device is less than the threshold (Yes at 540), control of the device is released or allowed to increase to a higher energy level at 545. Further, the computing device may enter a sleep mode at 550 and an iteration of the demand response process may be deemed done at 580. The process 500 may then return to 505 for another iteration.

Conversely, if the combination of the forecasted demand and the differential demand of the device is not less than the threshold (No at 540), the iteration of the demand response process may be deemed done at 580 without releasing control of the device. Again, the process 500 may then return to 505 for another iteration.

This processing may be performed onsite or offsite and may also include a more traditional fail-over system to allow a user to override control under exigent circumstances.

Figure 6:
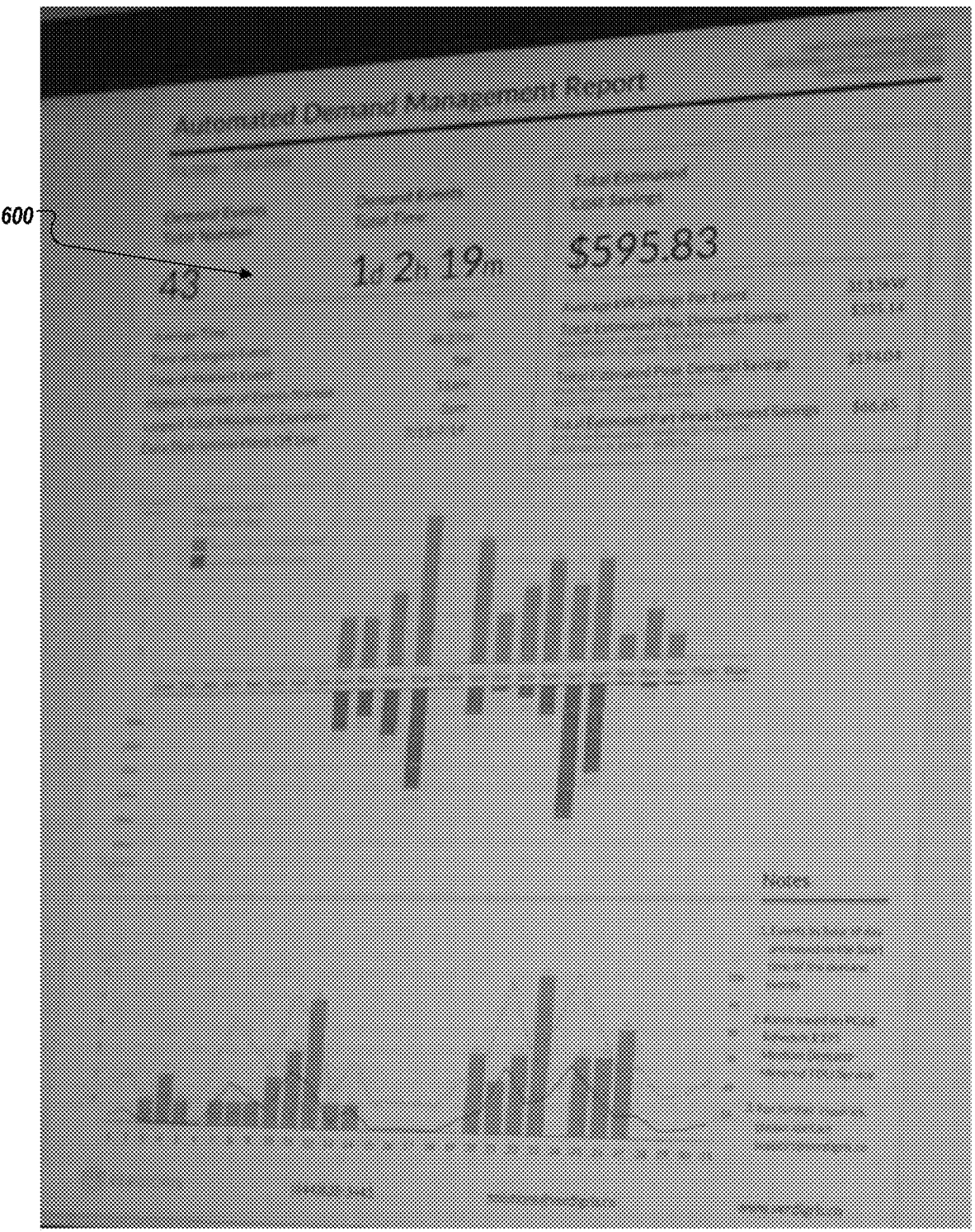
FIG. 6 illustrates an example demand management reporting interface in accordance with an example implementation.

FIG. 6 illustrates an example demand management reporting interface 600 in accordance with an example implementation. The load processor 150 provides users (e.g., home owners, building engineers, etc.) comprehensive reports including energy forecasts, alerts about faulty equipment, maintenance reminders, and detailed energy usage information for each and every device and appliance. The demand management reporting interface 600 includes reporting from a suite of applications to give users a comprehensive over-view of the building's performance with drill down historical and forecasted utility consumption and costs of each device.

Figure 7:
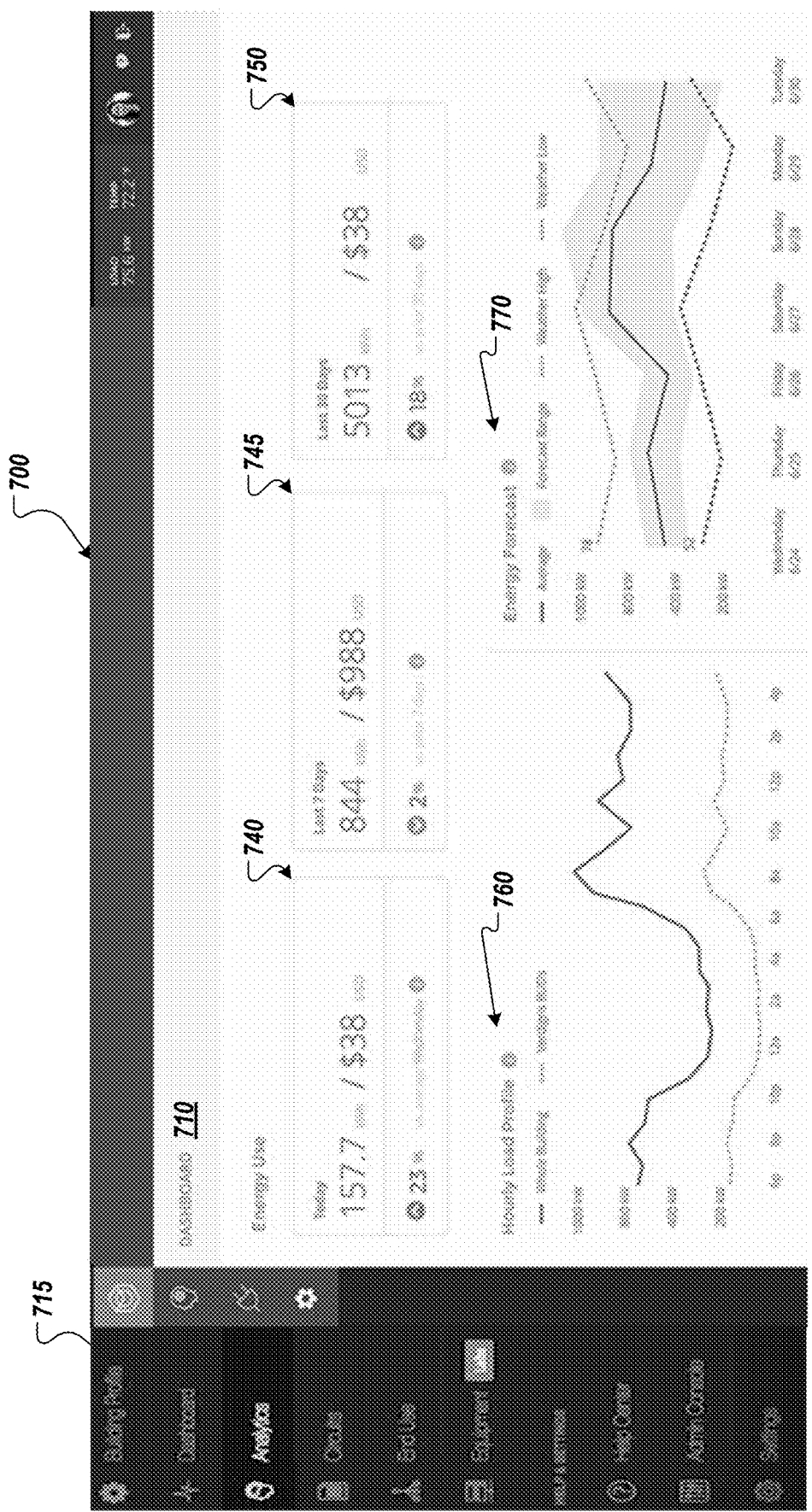
FIG. 7 illustrates an example forecasting interface in accordance with an example implementation.

FIG. 7 illustrates an example forecasting user interface UI 700 in accordance with an example implementation. As illustrated, the UI 700 provides a dashboard 710 that provides displays of daily history 740 (last day), weekly history 745 (last 7 days), and monthly history 750 (last 30 days). The UI 700 can also include a chart of historic hourly load profile 760 and a chart of forecasted load 770. The UI 700 may also provide a control bar 715 for accessing other profiles, circuit performance information or other analytics.

Figure 8:
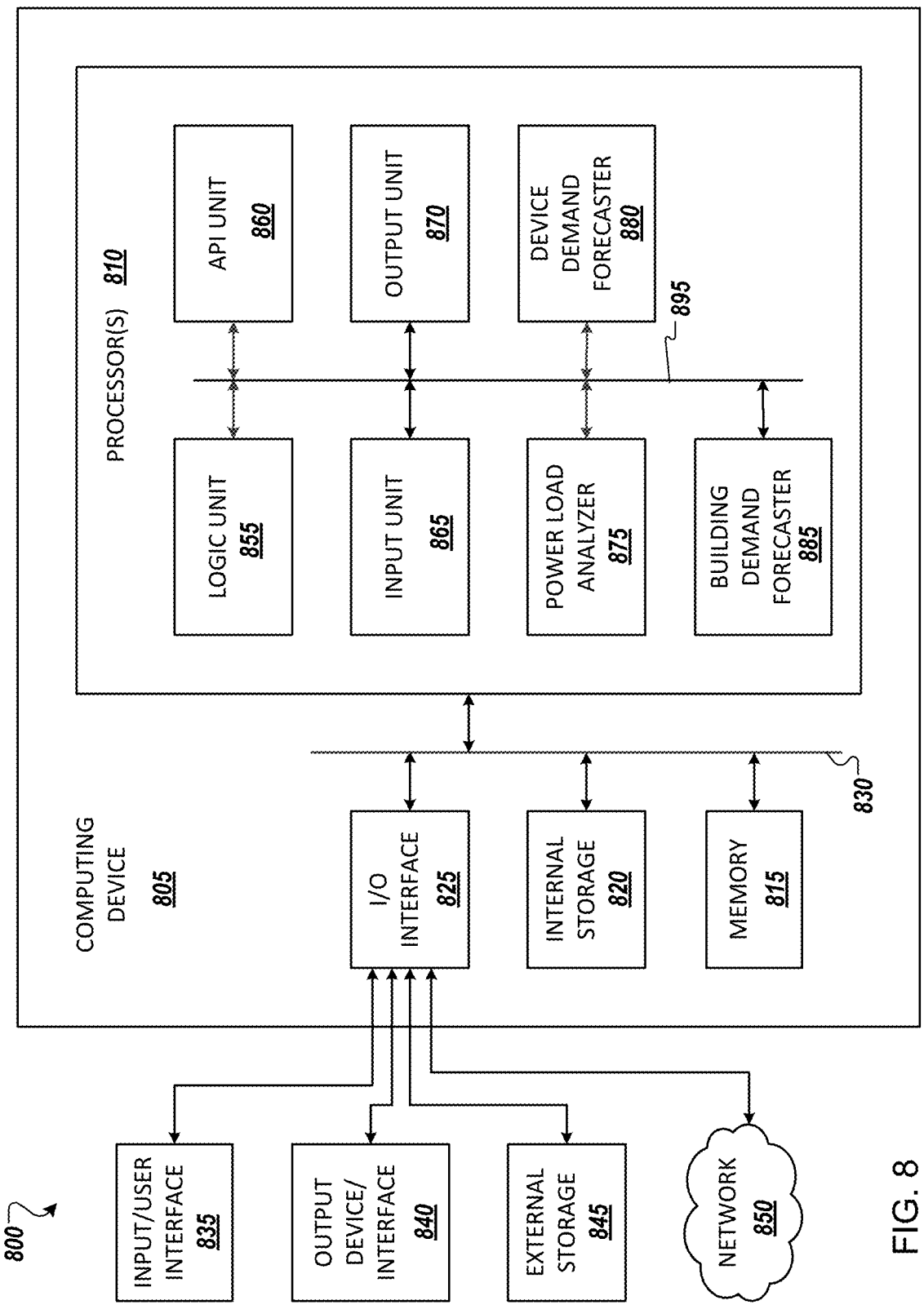
FIG. 8 illustrates an example computing environment with an example computer device suitable for use in some example implementations of the present application.

FIG. 8 illustrates an example computing environment 800 with an example computer device 805 suitable for use in some example implementations. Computing device 805 in computing environment 800 can include one or more processing units, cores, or processors 810, memory 815 (e.g., RAM, ROM, and/or the like), internal storage 820 (e.g., magnetic, optical, solid state storage, and/or organic), and/or I/O interface 825, any of which can be coupled on a communication mechanism or bus 830 for communicating information or embedded in the computing device 805.

Computing device 805 can be communicatively coupled to input/interface 835 and output device/interface 840. Either one or both of input/interface 835 and output device/interface 840 can be a wired or wireless interface and can be detachable. Input/interface 835 may include any device, component, sensor, or interface, physical or virtual, which can be used to provide input (e.g., buttons, touch-screen interface, keyboard, a pointing/cursor control, microphone, camera, braille, motion sensor, optical reader, and/or the like).

Output device/interface 840 may include a display, television, monitor, printer, speaker, braille, or the like. In some example implementations, input/interface 835 (e.g., user interface) and output device/interface 840 can be embedded with, or physically coupled to, the computing device 805. In other example implementations, other computing devices may function as, or provide the functions of, an input/interface 835 and output device/interface 840 for a computing device 805. These elements may include, but are not limited to, well-known AR hardware inputs so as to permit a user to interact with an AR environment.

Examples of computing device 805 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, server devices, other computers, information kiosks, televisions with one or more processors embedded therein and/or coupled thereto, radios, and the like).

Computing device 805 can be communicatively coupled (e.g., via I/O interface 825) to external storage 845 and network 850 for communicating with any number of networked components, devices, and systems, including one or more computing devices of the same or different configuration. Computing device 805 or any connected computing device can be functioning as, providing services of, or referred to as a server, client, thin server, general machine, special-purpose machine, or another label.

I/O interface 825 can include, but is not limited to, wired and/or wireless interfaces using any communication or I/O protocols or standards (e.g., Ethernet, 802.11xs, Universal System Bus, WiMAX, modem, a cellular network protocol, and the like) for communicating information to and/or from at least all the connected components, devices, and networks in computing environment 800. Network 850 can be any network or combination of networks (e.g., the Internet, local area network, wide area network, a telephonic network, a cellular network, satellite network, and the like).

Computing device 805 can use and/or communicate using computer-usable or computer-readable media, including transitory media and non-transitory media. Transitory media includes transmission media (e.g., metal cables, fiber optics), signals, carrier waves, and the like. Non-transitory media includes magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computing device 805 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C #, Java, Visual Basic, Python, Perl, JavaScript, and others).

Processor(s) 810 can execute under any operating system (OS) (not shown), in a native or virtual environment. One or more applications can be deployed that include logic unit 855, application programming interface (API) unit 860, input unit 865, output unit 870, power load analyzer unit 875, device demand forecaster unit 880 and building demand forecaster unit 885, and inter-unit communication mechanism 895 for the different units to communicate with each other, with the OS, and with other applications (not shown).

For example, power load analyzer unit 875, device demand forecaster unit 880 and building demand forecaster unit 885, may implement one or more processes shown in FIGS. 2 and 5. The described units and elements can be varied in design, function, configuration, or implementation and are not limited to the descriptions provided.

In some example implementations, when information or an execution instruction is received by API unit 860, it may be communicated to one or more other units (e.g., power load analyzer unit 875, device demand forecaster unit 880 and building demand forecaster unit 885). For example, the power load analyzer unit 875 may receive power load information from a data collection system located at a building and disaggregate load waveform signals and identify device-based power loads using a neural network. The disaggregated load waveform signals and identified device-based power loads may be provided to the device demand forecaster unit 880 to perform historical device demand and performance analysis to generate device-based demand forecasting. The generated device-based demand forecasting may be provided to the building demand forecaster unit 885 to generate demand forecasts for the building to mitigate peak demand based on analysis of a power draw signal and the generated device-based demand forecasting.

In some instances, the logic unit 855 may be configured to control the information flow among the units and direct the services provided by API unit 860, input unit 865, power load analyzer unit 875, device demand forecaster unit 880 and building demand forecaster unit 885 in some example implementations described above. For example, the flow of one or more processes or implementations may be controlled by logic unit 855 alone or in conjunction with API unit 860.

Although a few example implementations have been shown and described, these example implementations are provided to convey the subject matter described herein to people who are familiar with this field. It should be understood that the subject matter described herein may be implemented in various forms without being limited to the described example implementations. The subject matter described herein can be practiced without those specifically defined or described matters or with other or different elements or matters not described. It will be appreciated by those familiar with this field that changes may be made in these example implementations without departing from the subject matter described herein as defined in the appended claims and their equivalents.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It can be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application may be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

Example implementations may also include a system comprising an interface operatively coupled to circuit based sensors configured to collect power draw performance for a building; a processor configured to: receive a training data set that includes a tracking of building or circuit power draw performance via the interface for machine learning, analyze the training data set using machine learning to train machine learning-based detection profiles that can be used to recognize patterns as peak or abnormal event data, analyze data collected from individual circuits based on detection profiles and a set of user thresholds to predict peak events; determining parameters for the peak event, and identifying a least intrusive response strategy to shift demand to recommend to a user.

The invention claimed is:

1. A method of managing energy, by use of processing logic that comprises a load processor as a cloud service, the method comprising:
receiving, by the load processor, power load information from a data collection system located at a building and using a cloud analysis layer that employs machine-learning and artificial intelligence for optimization control;
analyzing, by the load processor, the received power load information to disaggregate load waveform signals and identify device-based power loads by use of a neural network to perform historical device demand and performance analysis to generate device-based demand forecasting;
generating, by the load processor, demand forecasts for the building to mitigate peak demand based on analysis of a power draw signal and the generated device-based demand forecasting;
determining, by the load processor, whether the generated demand forecast for the building is to peak in a near future, based on threshold values of at least one of generated device-based demand forecasting, power price or cost information, and user behavior analysis; and detecting, by the load processor, a malfunction in individual devices connected to a central power system of the building based on the received power load information, the generated demand forecasts for the building, and the generated device-based demand forecasting.

2. The method of claim 1, wherein the receiving power load information comprises receiving power load information based on an electric draw of individual devices connected to the central power system of the building without requiring any changes to the individual devices.

3. The method of claim 1, wherein the generating demand forecasts for the building further comprises building one or more predictive models of how a building operates and power performance of each device in the building.

4. The method of claim 3, wherein the one or more predictive models of how the building operates comprises:
analyzing, by the load processor, historical power performance for each device;
correlating, by the load processor, historical power performance to weather information associated with the building.

5. The method of claim 3, wherein the one or more predictive models of how the building operates comprises:
analyzing, by the load processor, historical power performance for each device;
correlating, by the load processor, historical power performance to geographic information associated with the building.

6. The method of claim 3, wherein the one or more predictive models of how the building operates comprises:
analyzing, by the load processor, historical power performance for each device;
correlating, by the load processor, historical power performance to operation information associated with operation activities performed within the building.

7. The method of claim 1, further comprising generating, by the load processor, an adjustment schedule determining device-based set-points to reduce power load of at least one device associated with the determined device-based set-points during a time period based on changes in one or more of weather data and energy cost changes.

8. The method of claim 1, further comprising detecting, by the load processor, anomalies in building's energy performance based on the received power load information, the generated demand forecasts for the building, and the generated device-based demand forecasting.

9. The method of claim 8, further comprising scheduling a response strategy based on the received power load information and the generated device-based demand forecasting to drive the received power load information back to the generated demand forecast for the building.

10. A computing device for managing energy, the computing device comprising:
a load processor, and
a data collection system configured to provide power load information, the data collection system located at a building and using a cloud analysis layer that employs machine-learning and artificial intelligence for optimization control;
wherein the load processor is configured to:
analyze received power load information to disaggregate load waveform signals and identify device-based power loads by use of a neural network to perform historical device demand and performance analysis to generate device-based demand forecasting;
generate demand forecasts for the building to mitigate peak demand based on analysis of a power draw signal and the generated device-based demand forecasting;
determine whether the generated demand forecast for the building is to peak in a near future, based on threshold values of at least one of generated device-based demand forecasting, power price or cost information, and user behavior analysis; and
detect a malfunction in individual devices connected to a central power system of the building based on the received power load information, the generated demand forecasts for the building, and the generated device-based demand forecasting.

11. The computing device of claim 10, wherein the data collection system is configured to power load information based on an electric draw of individual devices connected to the central power system of the building without requiring any changes to the individual devices.

12. The computing device of claim 10, wherein the load processor is configured to generate the demand forecasts for the building by building one or more predictive models of how a building operates and the power performance of each device in the building.

13. The computing device of claim 12, wherein the load processor is configured to build the one or more predictive models of how the building operates by:
analyzing historical power performance for each device;
correlating historical power performance to weather information associated with the building.

14. The computing device of claim 12, wherein the load processor is configured to build the one or more predictive models of how the building operates by:
analyzing historical power performance for each device;
correlating historical power performance to geographic information associated with the building.

15. The computing device of claim 12, wherein the load processor is configured to build the one or more predictive models of how the building operates by:
analyzing historical power performance for each device;
correlating historical power performance to operation information associated with operation activities performed within the building.

16. The computing device of claim 10, wherein the load processor generates an adjustment schedule determining device-based set-points to reduce power load of a least one device associated with the determined device-based set-points during a time period based on changes in one or more of weather data and energy cost changes.

17. The computing device of claim 10, wherein the load processor detects anomalies in building's energy performance based on the received power load information, the generated demand forecasts for the building, and generated device-based demand forecasting.

18. The computing device of claim 17, wherein the load processor schedules a response strategy based on the received power load information and the generated device-based demand forecasting to drive the received power load information back to the generated demand forecast for the building.

19. A non-transitory computer readable medium having stored therein a program for making a computer execute a method of managing energy, the method comprising:

receiving power load information from a data collection system located at a building and using a cloud analysis layer that employs machine-learning and artificial intelligence for optimization control;

analyzing the received power load information to disaggregate load waveform signals and identify device-based power loads by use of a neural network to perform historical device demand and performance analysis to generate device-based demand forecasting;

generating demand forecasts for the building to mitigate peak demand based on analysis of a power draw signal and the generated device-based demand forecasting;

determining whether the generated demand forecast for the building is to peak in a near future, based on threshold values of at least one of generated device-based demand forecasting, power price or cost information, and user behavior analysis; and detecting a malfunction in individual devices connected to a central power system of the building based on the received power load information, the generated demand forecasts for the building, and the generated device-based demand forecasting.

20. The non-transitory computer readable medium of claim 19, wherein the generating demand forecasts for the building further comprises building one or more predictive models of how a building operates and the power performance of each device in the building; and wherein the one or more predictive models of how the building operates comprises:
  analyzing historical power performance for each device;
  correlating historical power performance to:
    weather information associated with the building,
    geographic information associated with the building, and
    operation information associated with operation activities performed within the building.

* * * * *